Patented Feb. 24, 1931

1,793,993

UNITED STATES PATENT OFFICE

EDGAR C. BRITTON AND WILLIAM H. WILLIAMS, OF MIDLAND, MICHIGAN, ASSIGNORS TO THE DOW CHEMICAL COMPANY, OF MIDLAND, MICHIGAN, A CORPORATION OF MICHIGAN

METHOD OF MAKING METHYL ARYLAMINES

No Drawing.    Application filed October 25, 1928.  Serial No. 315,099.

The present invention relates to methods for the preparation of methyl arylamines by the interaction of an arylamine and methyl alcohol, and particularly to such methods wherein a relatively small, or catalytic, amount of another methyl compound is employed to facilitate the reaction.

In a pending application, Serial No. 182,532, filed April 9, 1927, the present inventors have disclosed a method for the preparation of methyl anilines whereby a mixture of aniline and methyl alcohol is heated with addition of a relatively small amount, i. e., from one to two per cent., of methyl bromide. We have now found that the above method is applicable, with suitable modifications, to the preparation of N-methyl derivatives of arylamines in general. To the accomplishment of the foregoing and related ends the invention, then, consists of the steps hereinafter fully described and particularly pointed out in the claims, the following description setting forth but a few of the various ways in which the principle of the invention may be used.

The action of the methyl bromide, as employed in the present process, is apparently to assist or promote the attachment of methyl groups to the nitrogen of the amino group, with the formation at first of a quaternary aryl-methyl ammonium bromide, such latter compound then being dissociated at the reaction temperature yielding the free methyl arylamine and methyl bromide. The course of the reaction leading to the formation, respectively, of a mono-methyl- or a dimethyl arylamine, may be indicated by the Equations (1) and (2), and (3) and (4) respectively, wherein R represents an aryl radical, viz:

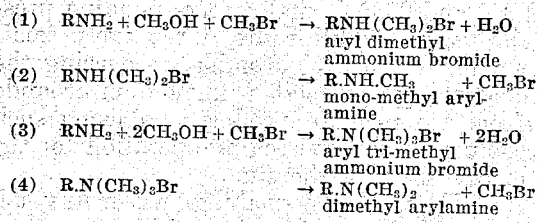

The methyl bromide may be introduced either as such or by means of a compound that will yield methyl bromide by dissociation during the reaction, such as an aryl or alkyl di- or tri-methyl ammonium bromide. Inasmuch as the methyl bromide is constantly re-formed during the process, as shown in Equations (2) and (4), a relatively small amount thereof, e. g., one to two per cent., based upon the weight of the arylamine, suffices for the complete conversion of the latter.

Generally speaking, in carrying out our improved method or process, we mix one mole of arylamine in which approximately from one to two per cent. of methyl bromide is admixed or dissolved, with somewhat more than the stoichiometrical proportion of methyl alcohol according to Equations (1) or (3). The mixture is then heated with continuous stirring in an iron autoclave for from 12 to 20 hours at a temperature between 200° and 260° C., preferably 220° to 240° C., and at a pressure equal to or in excess of that corresponding to the temperature. The separation of the reaction products may be effected either by distillation of the whole mass, or by mechanically separating the aqueous and oily layers which are worked up individually. In the former procedure the excess methyl alcohol distills over first, then the water and finally the methyl-arylamine product is distilled over under reduced pressure. Most of the methyl bromide in the form of the quaternary compound will be recovered in the still residue. When, on the other hand, the reaction mixture is allowed to stand, it separates into an aqueous alcohol and a methyl arylamine-alcohol layer. The latter is washed with water and distilled directly under vacuum. The wash water is added to the aqueous alcohol layer, which contains all of the methyl bromide in the form of the quaternary compound. Upon evaporating this solution for the recovery of alcohol substantially all of the methyl bromide, as the quaternary compound, remains in the residue from which it is recovered and may be used for introduction into a succeeding operation in place of methyl bromide, in such case only sufficient methyl bromide being added to the reaction mixture to make up for losses. In either of the above procedures, the excess of methyl alcohol is recovered for use over again.

By way of illustration of our improved method or process, the following specific examples are given. Such examples are not to be understood as a limitation upon our invention, however, as it is obvious that the present method is equally applicable to the preparation of other N-methyl-arylamines, and derivatives thereof.

*Example 1.*—A mixture of 1 mole para-toluidine, in which was dissolved 2 per cent. of its weight of methyl bromide, and 3.3 moles methyl alcohol was heated under pressure at a temperature of 230° C. for 20 hours. The reaction product was separated into two layers. Upon distillation of the oil layer a 92 per cent. yield of dimethyl-para-toluidine, B. P. 209° C., was obtained. An 85 per cent. recovery of excess methyl alcohol and 80 per cent. recovery of organic bromide were also realized.

*Example 2.*—A mixture of 1 mole α-naphthylamine, to which was added 2 per cent. of its weight of methyl bromide, and 3.3 moles methyl alcohol was heated under pressure at 220° C. for 20 hours. The oil layer obtained from the reaction product yielded upon distillation a mixture of mono-methyl- and di-methyl-α-naphthylamine, B. P. 275° C. Upon separation of the latter a yield of 30 per cent. mono-methyl- and 60 per cent. di-methyl-α-naphthylamine was obtained.

In either of the foregoing examples the methyl bromide is recovered in the form of a corresponding aryl-methyl ammonium bromide, which may be introduced into a succeeding operation for the methyl bromide therein.

While the examples specify 3.3 moles methyl alcohol to one mole arylamine, this proportion may be varied somewhat without materially affecting the result. In general from three to four moles methyl alcohol to one of arylamine may be used when the desired product is the dimethyl-arylamine. By decreasing the relative amount of methyl alcohol taken for the reaction, and/or shortening the time of reaction, under suitable control, the method may be directed principally, or wholly, to the production of mono-methyl-, instead of dimethyl-, arylamine. When both are produced together they may be subsequently separated by the usual methods, if desired.

We are aware that it has been proposed to employ iodine compounds, e. g., phenyl trimethyl ammonium iodide, as catalyst for the preparation of alkyl anilines, as disclosed in U. S. Patent 1,413,494 to Rogers. Such processes involving the use of iodine compounds, however, yield a product contaminated with the iodine derivative which can be removed only by special and costly procedure. The presence of the iodine compound causes the methyl aniline so produced to darken rapidly on exposure to the air thus detracting from its quality.

In contradistinction thereto, however, the method of the present invention makes use of methyl bromide, or a quaternary ammonium derivative thereof. Not only is the advantage gained of employing a relatively less expensive material, but the product also has been found to be of very superior quality and can be exposed to the air for long periods of time without discoloration or other detrimental effect.

The term "methyl bromide compound" employed in certain of the following claims is understood to include methyl bromide or any compound capable of yielding methyl bromide by dissociation or reaction during the operation of the herein disclosed method, as, for example, a quaternary aryl-methyl ammonium bromide.

Other modes of applying the principle of our invention may be employed instead of those explained, change being made as regards the methods herein disclosed, provided the step or steps stated by any of the following claims or the equivalent of such stated step or steps be employed.

We therefore particularly point out and distinctly claim as our invention:—

1. The method of making an N-methyl derivative of an arylamine which comprises reacting between such arylamine and methyl alcohol with addition of a relatively small amount of methyl bromide.

2. The method of making an N-methyl derivative of an arylamine which comprises heating a mixture of such arylamine and methyl alcohol at a temperature between 200° and 260° C. and a corresponding pressure with addition of a relatively small amount of methyl bromide.

3. The method of making an N-methyl derivative of an arylamine which comprises reacting between such arylamine and methyl alcohol with addition of a relatively small amount of methyl bromide, recovering the quaternary aryl-methyl ammonium bromide from the reaction product and using such compound in a succeeding operation for the methyl bromide therein.

4. The method of making an N-methyl derivative of an arylamine which comprises heating a mixture of such arylamine and methyl alcohol at a temperature between 200° and 260° C. and a corresponding pressure with addition of a relatively small amount of methyl bromide, recovering the quaternary aryl methyl ammonium bromide from the reaction product and using such compound in a succeeding operation for the methyl bromide therein.

5. The method of making an N-methyl derivative of an arylamine which comprises reacting between such arylamine and methyl alcohol with addition of a relatively small amount of a methyl bromide compound.

6. The method of making an N-methyl derivative of an arylamine which comprises heating a mixture of such arylamine and methyl alcohol at a temperature between 200° and 260° C. and a corresponding pressure with addition of a relatively small amount of a methyl bromide compound.

7. The method of making a methyl-para-toluidine which comprises reacting between para-toluidine and methyl alcohol with addition of a relatively small amount of methyl bromide.

8. The method of making dimethyl-para-toluidine which comprises heating a mixture of para-toluidine and methyl alcohol at a temperature of about 230° C. and a corresponding pressure with addition of a relatively small amount of methyl bromide.

9. The method of making dimethyl-para-toluidine which comprises heating a mixture of one mole para-toluidine and from three to four moles methyl alcohol at a temperature of about 230° C. and a corresponding pressure with addition of a relatively small amount of methyl bromide.

10. The method of making dimethyl-para-toluidine which comprises heating a mixture of one mole para-toluidine and from three to four moles methyl alcohol at a temperature of about 230° C. and a corresponding pressure with addition of a relatively small amount of methyl bromide, recovering tolyl-methyl ammonium bromide from the reaction product and using such compound in a succeeding operation for the methyl bromide therein.

Signed by us this 17th day of October, 1928.

EDGAR C. BRITTON.
WILLIAM H. WILLIAMS.